Feb. 10, 1970  F. IVALDI  3,494,567
METHOD AND APPARATUS FOR AUTOMATICALLY
TRANSPORTING HIDES AND/OR SKINS
Filed April 22, 1968  2 Sheets-Sheet 2

United States Patent Office 3,494,567
Patented Feb. 10, 1970

3,494,567
METHOD AND APPARATUS FOR AUTO-MATICALLY TRANSPORTING HIDES AND/OR SKINS
Franco Ivaldi, via Morghen 35, Turin, Italy
Filed Apr. 22, 1968, Ser. No. 723,127
Claims priority, application Italy, Oct. 3, 1967, 53,227/67
Int. Cl. B65h *17/02;* B65b *63/04*
U.S. Cl. 242—67.3                    8 Claims

ABSTRACT OF THE DISCLOSURE

Automatic apparatus for handling animal hides and/or skins which comprises a transporting horizontal tiltable frame supported by vertical uprights. The tilting is effected by a hydraulic cylinder which lifts one extremity of the transporting frame. The hides are conveyed over rows of intermeshed rotating disks and brushes and wound up on a flexible paper tape connecting an upper and a lower reels. These reels are carried by an A-frame member of the apparatus which is located at the extremity of the transporting frame and is removable therefrom.

---

The present invention is related to a method of and apparatus for the automatic handling, such as loading and unloading of animal hides and skins in machines conventionally employed in the various operations of the leather industry, such as curing and pretanning.

At present, in the leather industry, the various pretanning operations, whether carried out separately or on a continuous assembly line, call for manually loading and unloading of each operational machine. That is to say, an operator, takes the hides or skins one by one from the delivery end of one machine and introduces them by hand to the feed inlet of a subsequent processing piece of appartus. After the flaying, trimming and curing process, the hides and/or skins are sent to cold storage where they are sorted, packaged and prepared for forwarding to a tannery or other user.

It is, therefore, the main object of the present invention to provide a method and an apparatus for the automatic handling of the hides and skins with the ensuing savings in time and labor.

Another object of the invention is to provide a device which is of simple and sturdy construction and which permits the collection of the skins from the delivery end of any one machine of the processing cycle while maintaining the particular delivery arrangement.

It is a further object to provide means for the compact storage of the hides or skins on a single, transportable roll and permit the subsequent unrolling of the skins for conveyance to other apparatus, in a completely automated manner.

Other objects and advantages of the present invention will be apparent from the following detailed description thereof and from the accompanying drawings, in which.

Figure 1:
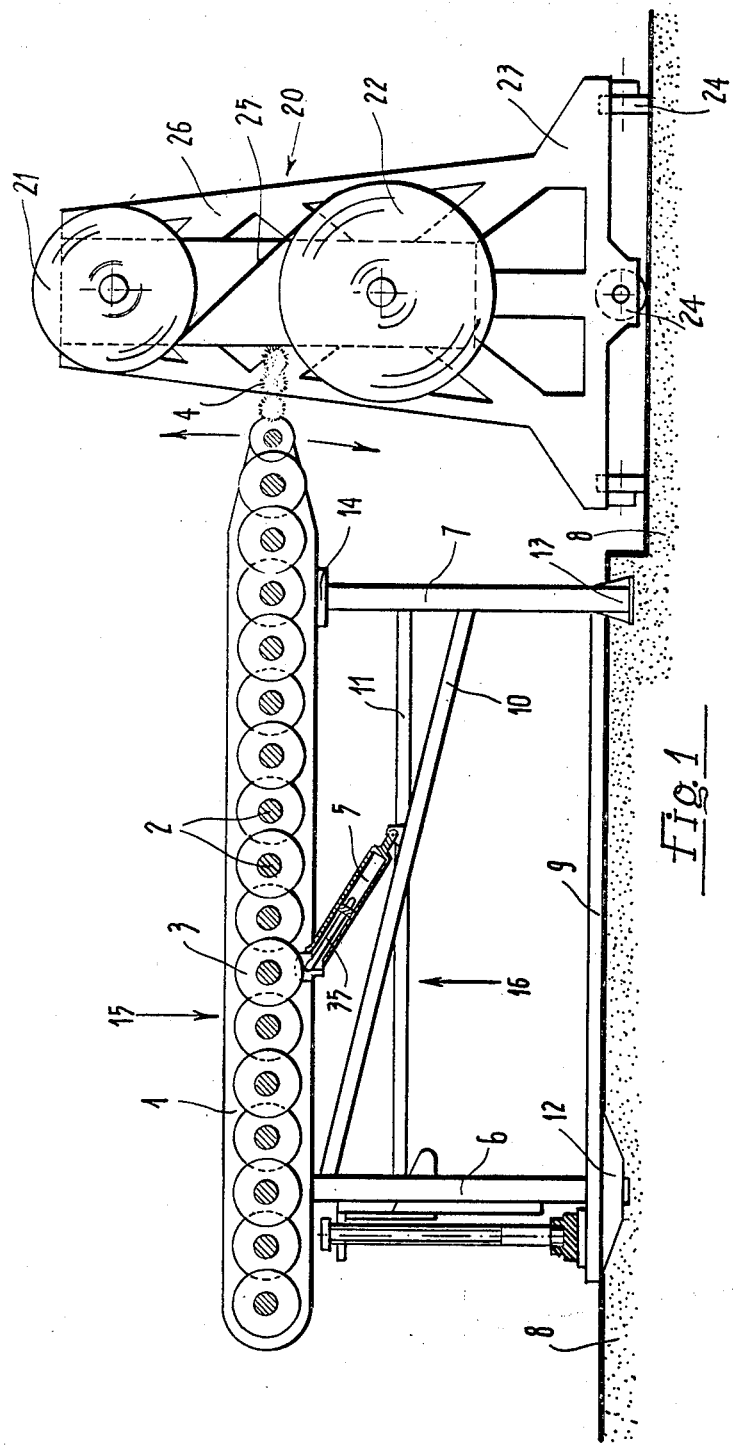
FIGURE 1 is a side view with a partial cross section of the transporting frame and the trestle supporting the reels.

Briefly stated, the method, according to the present invention, comprises the steps of receiving the hides or skins from one machine, such as, for instance, a drier, a surface measurer, a continuous press onto a transporting or conveying frame; feeding the conveyed hides or skins towards a flexible belt which unwinds from a first reel onto a second reel; and winding on said second reel the hides or skins, together with said flexible belt while maintaining the order of delivery of the hides or skins.

The unwinding of said belt or flexible tape from the first reel is done in such a way, that the flexible material (transporting the skins) is caused to be wound with the skins about said second reel, which increases in diameter as more and more skins are wound on the reel.

The device which permits the carrying out of the method of the present invention comprises essentially: a transporting frame which is placed in a substantially horizontal position and has one end pivotally connected to a supporting frame, while the other end is free and may be moved vertically; an A-frame member on which there are provided two free-rotating transversal reels, one of which has a roll of flexible tape wound thereon; and means to drive said transporting frame and causing the respective winding and unwinding of the flexible tape from one reel to the other.

Preferably, the transporting frame comprises a plurality of rotating rollers, some of which carry axially a row of thin and rigid disks, and others a row of cylindrical brushes with rigid bristles.

The distance between any two adjacent rollers is less than the disk diameter or, respectively, the cylindrical brush diameter, and the brushes and the disks are arranged in staggered order between any one row and the adjacent one.

Referring now to the drawings, the transporting frame 15 comprises two lateral members or sides wherein are journaled the ends of small diameter rollers or cylinders 2, some of which carry disks 3 and others are provided with cylindrical brushes 4.

The disks 3 of any two adjacent cylinders are arranged in staggered meshing order like the teeth of two gears, and the distance between the axes of the two adjacent cylinders is less than the diameter of the disks 3. The diameter of the cylindrical brushes 4 is smaller than that of the disks 3, and the brushes are also arranged in staggered order, so that those of one row mesh with those of the subsequent row. The transporting frame 15 is supported by a mounting or vertical frame 16 which comprises uprights 6 and 7 and crosspieces 9, 10 and 11. The transporting frame 15 is hinged to the upright 6 and bears on a mobile crosspice 14 provided on the top of upright 7. A hydraulic cylinder 5 is pivotably connected to the crosspiece 10 of the vertical mounting 16 and its movable bar 35 is similarly connected to the transporting frame 15.

The lower extremities of uprights 6 and 7 are provided with legs 12 and 13 firmly fixed to the bearing plane or floor 8.

At one end of the transporting frame 15 there is provided a portal-shaped or A-frame trestle 20 formed of two lateral and vertical side members 26 each having a bearing base 23 and carrying wheels 24.

Upon the trestle 20 and between the two side members 26 thereof are located two reels 21 and 22 around which is wound a flexible tape 25, which may be, for instance, of paper, cloth or plastic material.

Figure 2:
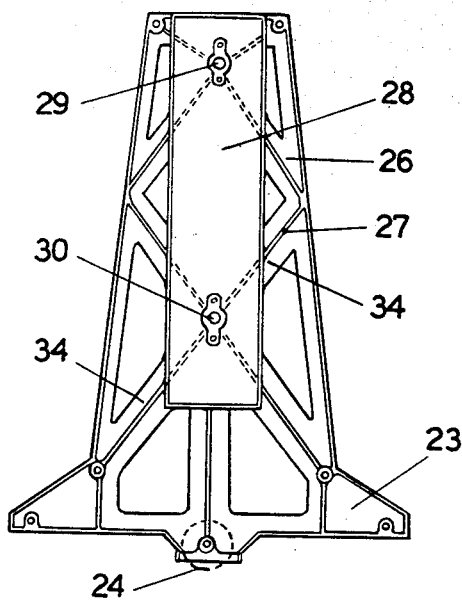
FIGURE 2 is a more detailed view of one of the two vertical members of the trestle of FIGURE 1.

Each side member 26 of trestle 20 comprises (FIGURE 2) metallic arms 34 (provided with reinforcing ribs 27) and a rectangular plate 28 which has two circular openings 29 and 30 for the support of the axes of reels 21 and 22.

Figure 3:
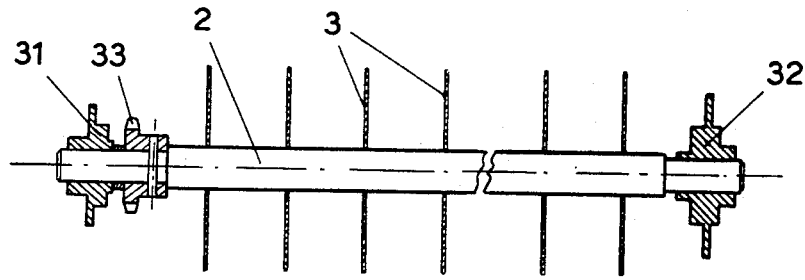
FIGURE 3 is an axial sectional view, on enlarged scale, of one of the transporting rollers.

The cylinders or rollers 2 of the transporting frame 15 which carry the disks 3 or the brushes 4 regularly spaced along the respective axes, have their axial terminals (FIGURE 3) engaged in conventional metallic flanges 31 and 32. A gear wheel 33 is keyed on to each cylinder 2 in proximity of one of the flanges.

Figure 4:
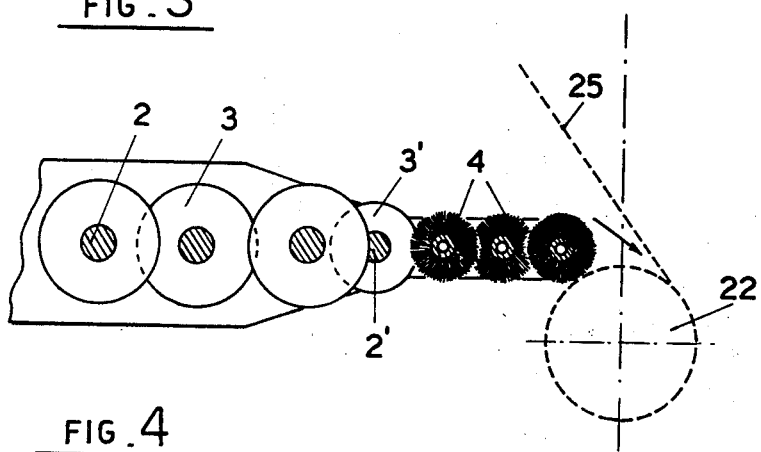
FIGURE 4 is an enlarged detailed view of the transporting rollers of FIGURE 1.

FIGURE 4 represents, on an enlarged scale, a particular embodiment of the right end side of the transporting frame 15. It may be readily seen that, between the zone of the staggered disks 3 and that of the brushes 4, a row is disks 3, having a diameter smaller than that of the preceding disks 3 and greater than that of the brushes 4, is interposed.

Figure 5:
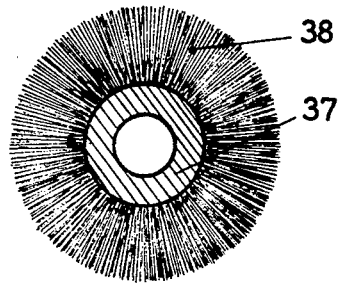
FIGURE 5 is an enlarged view of one particular construction of one of the brushes of FIGURE 1.

FIGURE 5 represents one of the brushes 4, which is preferentially formed by a hollow central core 37 wherein the bristles 38 are threaded.

The operation will now be described of the device of the invention, assuming that it is utilized to discharge the skins from a working machine onto the flexible tape.

A mechanical device of known type, not shown, such as, for instance, a driving chain which meshes with the gear wheel 33 of cylinders 2 and is actuated by an electric motor, causes said cylinders to rotate in a clockwise direction. The same or an analogous motor moves reel 22 so that the tape 25 is wound around the reel 22 while it unwinds from the upper reel 21 (suitably braked).

The linear speed of tape 25 is slightly greater than the peripherical speed of disks 3 of the rotating cylinders.

The transporting frame 15 is planarly so positioned that brushes 4 on its right hand extremity are situated slightly higher than reel 22 and skim it during their rotation. The incoming skins from the delivery working machine (a drier for instance) pass automatically from the machine, on the left hand side of the transporting frame 15 and are laid upon the disks 3.

Due to the friction existing between the skin surfaces and the edges of disks 3, the rotation of cylinders 2 causes the feeding of the skin towards the right hand side, the skins remaining constantly extended due to the small spacing between adjacent disks and to the staggered arrangement of disks of adjacent rows.

The extended skin runs, therefore, along the transporting frame, passing subsequently over the row of disks 3 having a reduced diameter and upon the cylindrical brushes 4, the bristles 38 of which are caused to bend slightly due to the weight of the skins. The skins are finally carried delicately and always extended, upon the flexible (e.g., paper) tape 25 which has been wound around reel 22.

The already wound tape 25 accepts the skins due to the roughness of its surface and to its linear speed which is greater than the peripheral speed of disks 3 and brushes 4, but causes a slight slipping of the skins, thus preventing the skins from overlapping one another with the consequent formation of plies. The skin trailed by the already wound tape 25, after a further small advance on the periphery of reel 22, remains confined between two tape layers and is spirally wound on the receiving reel.

During this phase of the operation, the tightening pressure exerted by tape 25 upon the confined skins may be adjusted by the control of the brake acting upon upper reel 21.

The diameter of reel 22 increases rapidly due to the winding of the skins thereon. At the same time, frame 15 tilts, lifting its right hand extremity due to the action of the hydraulic cylinder 5, which is controlled by a member (not shown) which detects the incremental increase in reel diameter, so that the brushes are always skimming the top of reel 22. In this manner, the subsequent skins delivered by the transporting frame, always arrive to the tape in the most suitable winding condition.

The motor actuating reel 22 may be provided with an automatic speed controlling device, so that, as the reel 22 diameter increases, its speed of rotation is simultaneously reduced to maintain a constant linear speed of tape 25. Speed controlling devices of this type are well known in the art and, therefore, need not be further described. There may be also provided a conventional and known device for centering of the tape 25 on the reel on which it is wound. To this end, a thin mettallic bar slightly curved is generally utilized, threaded to idle short rubber cylinders bearing against the free zone of the tape.

When the last skin delivered from the frame 15 has wound on the receiving lower reel, the rotation of cylinders 2 is stopped by means of a manual or automatic control and the reel 22, containing all the skins in extended position and not in contact with one another, may be discharged from trestle 20, or, in the alternative, the trestle 20 may be removed from its position and transported elsewhere on its wheels.

The skin-laden reel may easily be packed and is thus ready for shipping or storage, or it may be directly unwound to feed another machine or conveyor belt. To this end, it is merely sufficient to rotate in the opposite direction to the herebefore preceding one the reel 21 and rollers 2, and the skins will be picked up by the rotating brushes 4 and again extended on the transporting frame 15 to feed another machine.

The great advantage derived from the use of a device according to the present invention is quite evident: due to the automation of this device, charging and discharging of each working machine is no longer a necessary individual operation, but a single operator may simultaneously control a plurality of machines or machine chains, intervening only at the beginning and the end of each batch of skins.

The start and stop operations of both rollers and reels may also be readily automated as, for intsance, by means of conventional pressure-actuated switches, tripped by the skins themselves or by other known means.

In the hereabove described illustration it has been assumed that the inclination adjustment of the frame is made by a hydraulic cylinder. However, it is obvious that other mechanical, hydraulic or electrical systems may be employed. Even the motion transmission to the cylinders 2 may be achieved through different mechanical systems of known type, employed, for instance, in connection with the transporting frame instead of with the chain, as herebefore described.

Rotation of the upper or the lower reels or both may be obtained either by a proper motor (controlling its speed as previously stated) or by a mechanical power take-off from the same motor which actuates the transporting frame and varies its planar inclination with respect to the horizontal.

No claim is here laid to any of these devices for actuating or controlling the movement of the various elemental components of the device of the invention. They are considered conventional, as they may be of any suitable type, and are well known in the art.

It should be, finally, mentioned that the transporting frame 15 may be partially or wholly consisting of a transporting tape or belt rather than disks, as illustrated, its function being only the transportation of skins keeping them in extended position between a working machine and the collecting reel, or in the opposite direction.

What is claimed is:

1. Apparatus for handling automatically hides and/or skins which comprises:
    (a) a transporting, horizontal, tiltable frame comprising a pair of parallel lateral members enclosing therebetween a plurality of rotating rollers having axially thereon disks and brushes;
    (b) a supporting vertical frame comprising a first upright pivotably connected to said transporting frame, a second upright freely supporting a terminal of said transporting frame, and a plurality of crosspieces fixedly connecting said uprights.
    (c) means for tilting said transporting frame from its horizontal position, pivotably connecting the underside of said transporting frame to one of said crosspieces, said crosspiece being diagonally connected to said uprights;

(d) an A-frame trestle positioned at one extremity of said transporting frame and comprising a pair of lateral vertical members supporting therebetween an upper reel and a lower reel connected to each other by a moving flexible hide-receiving tape, said trestle resting on movable caster-like bearing members; and (e) means for coordinating the synchronized rotation of said plurality of rollers and of said reels.

2. The apparatus of claim 1, wherein the disks of any one of said rollers are in staggered meshed relationship with the disks of another roller adjacent to said one roller, the distance between the longitudinal axes of said two adjacent rollers being less than the diameter of said disks.

3. The apparatus of claim 1, wherein the brushes of said rollers have diameter smaller than the diameter of the disks, said brushes axially positioned on the axis of one of said rollers being in staggered meshed relationship with the brushes of an adjacent roller and being formed of hollow central cores with bristles threaded thereon.

4. The apparatus of claim 1, wherein said flexible tape connecting said upper and lower reels is constructed of paper with one side thereof superficially roughened for better contact with the hide.

5. The apparatus of claim 1, wherein said lateral vertical members of said A-frame trestle are provided with rectangular plates with openings therein for the support of the axles of said upper and lower reels.

6. The apparatus of claim 1, wherein each of said rotating rollers in said transporting frame has keyed therein a gear wheel for synchronized rotation by means of a motor-actuated driving chain connected to each of said gear wheels.

7. The apparatus of claim 1, wherein said transporting frame comprises from one extremity to the other extremity a plurality of rollers provided with intermeshing disks, a single roller provided with intermeshing disks of diameter smaller than said first mentioned disks, and a plurality of rollers provided with intermeshing brushes of diameter smaller than that of the disks on said single roller.

8. The apparatus of claim 1, wherein the linear speed of said flexible tape is greater than the peripheral speed of said rotating rollers of said transporting frame, said linear speed being maintained substantially constant by means of a motor-driven brake acting upon the upper reel.

References Cited

UNITED STATES PATENTS

| 1,126,006 | 1/1915 | Harwood | 242—59 |
| 2,789,406 | 4/1957 | Mosier | 53—118 |
| 3,133,386 | 5/1964 | Johnston | 53—26 |

LEONARD D. CHRISTIAN, Primary Examiner

U.S. Cl. X.R.
53—118; 214—83